(12) United States Patent
Kurata et al.

(10) Patent No.: US 12,136,411 B2
(45) Date of Patent: Nov. 5, 2024

(54) TRAINING OF MODEL FOR PROCESSING SEQUENCE DATA

(71) Applicant: INTERNATIONAL BUSINESS MACHINES CORPORATION, Armonk, NY (US)

(72) Inventors: Gakuto Kurata, Tokyo (JP); Kartik Audhkhasi, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 760 days.

(21) Appl. No.: 16/839,976

(22) Filed: Apr. 3, 2020

(65) Prior Publication Data

US 2021/0312294 A1 Oct. 7, 2021

(51) Int. Cl.
*G06N 3/084* (2023.01)
*G06F 17/18* (2006.01)
*G06F 18/24* (2023.01)
*G06N 3/047* (2023.01)
*G10L 15/06* (2013.01)

(52) U.S. Cl.
CPC ............ *G10L 15/063* (2013.01); *G06F 17/18* (2013.01); *G06F 18/24* (2023.01); *G06N 3/047* (2023.01); *G06N 3/084* (2013.01)

(58) Field of Classification Search
CPC .............................. G06N 3/084; G06N 3/0472
See application file for complete search history.

(56) References Cited

U.S. PATENT DOCUMENTS

| 6,289,434 | B1* | 9/2001 | Roy ................... G06F 15/8007 |
| | | | 712/34 |
| 9,733,141 | B1* | 8/2017 | Miles .................... G01M 15/14 |
| 10,192,556 | B2 | 1/2019 | Sak et al. |
| 10,373,610 | B2 | 8/2019 | Liu et al. |
| 10,824,434 | B1* | 11/2020 | Settle ................. G06F 9/30109 |
| 11,602,327 | B2* | 3/2023 | Lafon ....................... A61B 8/00 |
| 2016/0171974 | A1* | 6/2016 | Hannun ................. G06N 3/084 |
| | | | 704/232 |

(Continued)

FOREIGN PATENT DOCUMENTS

| CN | 108269568 A | 7/2018 |
| CN | 110246486 A | 9/2019 |
| CN | 110349570 A | 10/2019 |

OTHER PUBLICATIONS

Kurata et al. (Improved Knowledge Distillation from Bi-Directional to Uni-Directional LSTM CRC for End-to-End Speech Recognition, Dec. 2018, pp. 411-417) (Year: 2018).*

(Continued)

*Primary Examiner* — George Giroux
(74) *Attorney, Agent, or Firm* — Tutunjian & Bitetto, P.C.; Robert Richard Aragona

(57) ABSTRACT

A technique for training a model is disclosed. A training sample including an input sequence of observations and a target sequence of symbols having length different from the input sequence of observations is obtained. The input sequence of observations is fed into the model to obtain a sequence of predictions. The sequence of predictions is shifted by an amount with respect to the input sequence of observations. The model is updated based on a loss using a shifted sequence of predictions and the target sequence of the symbols.

22 Claims, 10 Drawing Sheets

(56) References Cited

U.S. PATENT DOCUMENTS

| | | | |
|---|---|---|---|
| 2017/0148431 | A1 | 5/2017 | Catanzaro et al. |
| 2018/0130474 | A1 | 5/2018 | Sak et al. |
| 2018/0261213 | A1 | 9/2018 | Arik et al. |
| 2019/0013015 | A1 | 1/2019 | Menendez-Pidal et al. |
| 2019/0057683 | A1 | 2/2019 | Sak et al. |
| 2019/0074028 | A1* | 3/2019 | Howard .................. G10L 15/20 |
| 2019/0196821 | A1* | 6/2019 | Madduri ............. G06F 9/30032 |
| 2020/0043483 | A1 | 2/2020 | Prabhavalkar et al. |
| 2020/0272417 | A1* | 8/2020 | Feng ....................... G06N 3/063 |

OTHER PUBLICATIONS

Abdel-Hamid et al. (Convolutional Neural Networks for Speech Recognition, Jul. 2014, 1533-1545) (Year: 2014).*

Mostafa (Supervised Learning Based on Temporal Coding in Spiking Neural Networks, Jul. 2018, pp. 3227-3235) (Year: 2018).*

Ponulak et al. (Supervised Learning in Spiking Neural Networks with ReSuMe: Sequence Learning, Classification and Spike-Shifting, 2010, pp. 1-31) (Year: 2010).*

Victor (Spike train metrics, Sep. 2005, pp. 585-592) (Year: 2005).*

Dominguez-Morales et al. (Deep Spiking Neural Network model for time-variant signals classification: a real-time speech recognition approach, Oct. 2018, pp. 1-8) (Year: 2018).*

Wu et al. (A Spiking Neural Network Framework for Robust Sound Classification, Nov. 2018, pp. 1-17) (Year: 2018).*

Smith et al. (Efficient coding of time-relative structure using spikes, Jan. 2005, pp. 1-40) (Year: 2005).*

Kim, Suyoun, et al., "Improved training for online end-to-end speech recognition systems." arXiv preprint arXiv, Nov. 2017, 5 pages, 1711,02212.

Sak, Haşim, et al. "Acoustic Modelling with CD-CTC-SMBR LSTM RNNS," 2015 IEEE Workshop on Automatic Speech Recognition and Understanding (ASRU). IEEE, Dec. 2015, pp. 604-609.

Kurata, Gakuto, et al., "Guiding CTC posterior spike timings for improved posterior fusion and knowledge distillation," arXiv preprint arXiv:, Apr. 2019, 5 pages, 1904.08311.

Transmittal Form PTO/SB/21 dated Apr. 3, 2020.

International Search Report for IB2021/052308 dated Jun. 24, 2021, 9 pages.

Notice of Reasons for Refusal for JP 2022-555091 dated Aug. 29, 2024. (5 pages).

* cited by examiner

TRAINING OF MODEL FOR PROCESSING SEQUENCE DATA

BACKGROUND

The present disclosure, generally, relates to machine learning, more particularly, to technique of training a model used for processing sequence data.

An end-to-end automatic speech recognition (ASR) system using CTC (Connectionist Temporal Classification) loss function has been gathering attention due to its ease of training and efficiency of decoding. The end-to-end ASR system uses a CTC model to predict a sequence of subwords or words with or without a subsequent language model. The CTC-based ASR can operate faster than related NN (Neural Network)/HMM (Hidden Markov Model) hybrid systems. Thus, a significant reduction in power consumption and computational resource cost is expected.

A combination of a unidirectional LSTM model with the CTC loss function is one of the promising ways to build steaming ASRs. However, typically, such combination suffers from time delay between acoustic features and output symbols during decoding, which increases latency of the streaming ASRs. The related NN/HMM hybrid systems trained from frame-level forced alignments between acoustic features and output symbols do not suffer from the time delay. In contrast to the hybrid models, the CTC models are typically trained with training samples having different lengths of acoustic features and output symbols. This means that there is no time alignment supervision. The CTC model trained without the frame level alignment yields output symbols after the models consume sufficient information for the output symbols, which results in time delay between acoustic features and output symbols.

To reduce the time delay between the acoustic features and the output symbols, a method of applying constraints on the CTC alignment is proposed (Andrew Senior, et al., "Acoustic modelling with CD-CTC-sMBR LSTM RNNs," in Proc. ASRU, 2015, pp. 604-609.). It has been investigated that delay can be limited by restricting the set of search paths used in the forward-backward algorithm to those in which the delay between CTC labels and the "ground truth" alignment does not exceed some threshold. However, the method disclosed in this literature requires iterative steps to prepare frame-level forced alignments prior to CTC model training.

U.S. patent application 20170148431A1 discloses end-to-end deep learning systems and methods to recognize speech of vastly different languages, such as English or Mandarin Chinese. The entire pipelines of hand-engineered components are replaced with neural networks, and the end-to-end learning allows handling a diverse variety of speech including noisy environments, accents, and different languages. However, the technique disclosed in this patent literature tries to modify neural network topologies.

U.S. patent application 20180130474A1 discloses methods, systems, and apparatus, including computer programs encoded on computer storage media for learning pronunciations from acoustic sequences. The method includes stacking one or more frames of acoustic data to generate a sequence of modified frames of acoustic data, processing the sequence of modified frames of acoustic data through an acoustic modeling neural network including one or more recurrent neural network (RNN) layers and a final CTC output layer to generate a neural network output. The technique disclosed in this patent literature merely adjusts the input to the encoder to reduce frame rate.

Therefore, there is a need for a novel training technique capable of reducing time delay between outputs and inputs of a model that is trained with training samples having different lengths of input observations and output symbols in an efficient manner.

SUMMARY

According to an embodiment of the present invention, a computer-implemented method for training a model is provided. The method includes obtaining a training sample that includes an input sequence of observations and a target sequence of symbols that has length different from the input sequence of observations. The method also includes feeding the input sequence of observations into the model to obtain a sequence of predictions. The method further includes shifting the sequence of predictions by an amount with respect to the input sequence of observations. The method further includes updating the model based on a loss using a shifted sequence of predictions and the target sequence of the symbols.

The method according to the embodiment of the present invention enables the trained model to output predictions at an appropriate timing to reduce latency of a prediction process with respect to an input.

In a preferable embodiment, the sequence of predictions can be shifted forward with respect to the input sequence of observations to generate the shifted sequence of predictions and the model is unidirectional. The method enables the trained model to output predictions earlier to reduce latency of a prediction process with respect to an input. The model trained by the method is suitable for a streaming application.

In a particular embodiment, the model can be a recurrent neural network based model. In a particular embodiment, the loss can be a CTC (Connectionist Temporal Classification) loss.

In a particular embodiment, shifting the sequence of predictions includes adjusting so that the lengths of the shifted sequence of predictions and the input sequence of observations are the same.

In a preferable embodiment, shifting the sequence of predictions and updating the model using the shifted sequence of predictions can be performed at a predetermined rate. Thereby, the method enables the trained model to balance accuracy and latency of the prediction process.

In a particular embodiment, the model can be a neural network based model having a plurality of parameters. Feeding the input sequence includes conducting forward-propagation through the neural network based model. Updating the model includes performing back-propagation through the neural network based model to update the plurality of parameters.

In a further preferable embodiment, the model can be an end-to-end speech recognition model. Each observation in the input sequence of the training sample can represent an acoustic feature and each symbol in the target sequence of the training sample can represent a phone, a context dependent phone, a character, a word-piece or a word. Thereby, the method can enable the speech recognition model to output a recognized result at an appropriate timing to reduce overall latency of a speech recognition process, or provides more time for a subsequent process to improve the recognition accuracy.

Computer systems and computer program products relating to one or more aspects of the present invention are also described and claimed herein.

According to other embodiment of the present invention, a computer program product for decoding using a model is provided. The computer program product includes a computer readable storage medium having program instructions embodied therewith. The program instructions executable by a computer to cause the computer to perform a method including feeding an input into the model to obtain an output. The model is trained by: obtaining a training sample including an input sequence of observations and a target sequence of symbols having length different from the input sequence of observations. It can be further trained by feeding the input sequence of observations into the model to obtain a sequence of predictions, shifting the sequence of predictions by an amount with respect to the input sequence of observations, and updating the model based on a loss using a shifted sequence of predictions and the target sequence of the symbols.

The computer program product according to the embodiment of the present invention is able to output predictions at an appropriate timing to reduce latency of a prediction process with respect to an input.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Hereinafter, the present invention will be described with respect to particular embodiments, but it will be understood by those skilled in the art that the embodiments described below are mentioned only by way of examples and are not intended to limit the scope of the present invention.

One or more embodiments according to the present invention are directed to computer-implemented methods, computer systems and computer program products for training a model used for processing sequence data, in which a sequence of predictions obtained from the model being trained is shifted by an amount with respect to an input sequence of observations and the shifted sequence of predictions is used to update the model based on a loss computed.

Hereinafter, first referring to FIGS. 1-4, a computer system for training a model according to an exemplary embodiment of the present invention, in which the model to be trained is a CTC (Connectionist Temporal Classification) model for speech recognition and the sequence data to be processed is a sequence of acoustic features, will be described. Then, referring to FIG. 5, a computer-implemented method for training a model according to an exemplary embodiment of the present invention, in which the model to be trained by the method is a CTC model for speech recognition and the sequence data to be processed is a sequence of acoustic features, will be described. Then, experimental studies on novel CTC training for speech recognition according to the exemplary embodiment of the present invention will be described with reference to FIGS. 6-9. Finally, referring to FIG. 10, a hardware configuration of a computer system according to one or more embodiments of the present invention will be described.

Hereinafter, referring to FIG. 1, a block diagram of a speech recognition system 100 including a forward-shifted CTC training system 110 according to an exemplary embodiment of the present invention is described.

Figure 1:
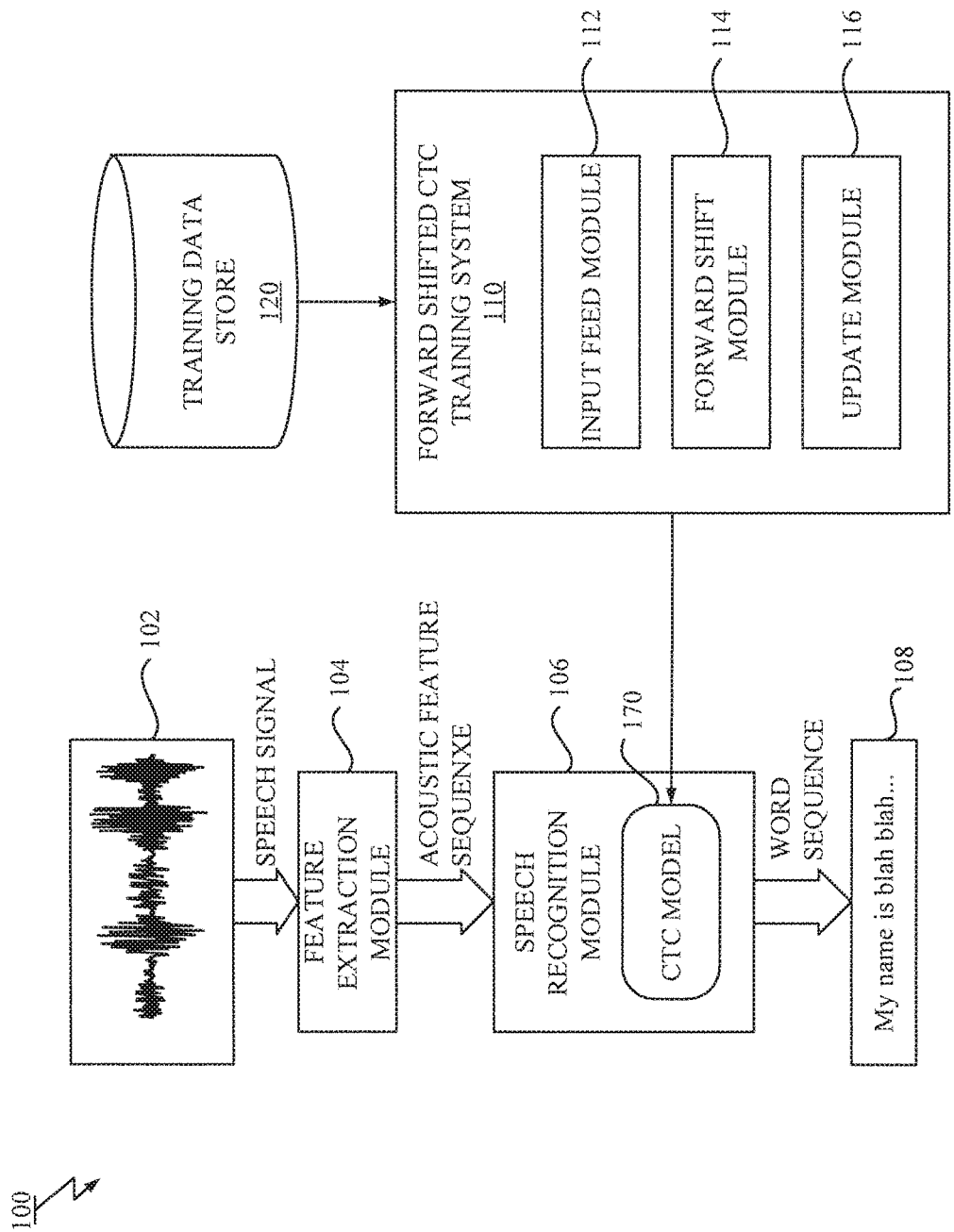
FIG. 1 illustrates a block diagram of a speech recognition system including a forward-shifted CTC (Connectionist Temporal Classification) training system for training a CTC model used for speech recognition according to an exemplary embodiment of the present invention.

As shown in FIG. 1, the speech recognition system 100 can include a feature extraction module 104 for extracting acoustic features from an input; and a speech recognition module 106 for performing speech recognition for the input.

The speech recognition system 100 according to the exemplary embodiment of the present invention further includes the forward-shifted CTC training system 110 for performing novel CTC training to obtain a trained CTC model 170 that constitutes the speech recognition module 106; and a training data store 120 for storing a collection of training data used in the novel CTC training performed by the forward-shifted CTC training system 110.

The feature extraction module 104 can receive, as an input, audio signal data 102 digitalized by sampling audio signal at a predetermined sampling frequency and predetermined bit depth. The audio signal can be input from a microphone, for instance. The feature extraction module 104 can also receive the audio signal data 102 from a remote client device through a network such as the internet. The feature extraction module 104 is configured to extract acoustic features from the received audio signal data 102 by any known acoustic feature analysis to generate a sequence of extracted acoustic features.

The acoustic features can include, but are not limited to, MFCC (Mel Frequency Cepstral Coefficient), LPC (Linear Predictive Coding) Coefficient, PLP (Perceptual Liner Prediction) Cepstral Coefficient, log Mel spectrum, or any combinations thereof. The acoustic features can further include 'dynamic' acoustic features such as, for example, delta features and double-delta features of the aforementioned acoustic features, which are static.

Note that elements of the acoustic feature sequence are called "frames" whereas the audio signal data 102 includes a series of sampled values of the audio signal at predetermined frequency. Generally, the audio signal data 102 is sampled at 8,000 Hz for narrowband audio and 16,000 Hz for broadband audio. The time duration of each frame in the acoustic feature sequence can be, but is not limited to, approximately 10-40 msec.

The speech recognition module 106 is configured to convert the input sequence of the extracted acoustic features into an output sequence of words. The speech recognition module 106 predicts most plausible speech contents for the input sequence of the extracted acoustic features using the CTC model 170 and outputs a result 108.

The speech recognition module 106 according to the exemplary embodiment of the present invention uses the CTC model 170 and can be an end-to-end model. In a particular embodiment, the speech recognition module 106 can include a sub-word (e.g., phone, character) unit end-to-end model. In other embodiments, the speech recognition module 106 can include a word unit end-to-end model. Examples of the unit of the end-to-end model can include phones, characters, context-dependent-phones such as triphones and a quinphones, word-pieces, words, etc. The speech recognition module 106 includes at least the CTC model 170. The CTC model 170 is a target of the novel CTC training performed by the forward-shifted CTC training system 110. The CTC model 170 is defined as a model trained by using a CTC loss function and its architecture is not limited.

When the speech recognition module 106 is configured as the sub-word (e.g., phone) unit end-to-end model, the speech recognition module 106 includes an appropriate language model such as an n-gram model and a neural network-based model (e.g., RNN (Recurrent Neural Network)) and a dictionary in addition to the CTC model 170 that outputs a sequence of sub-words. When the speech recognition module 106 is configured as the word unit end-to-end model, the speech recognition module 106 can merely include the CTC model 170 that outputs a sequence of words directly, and the language model and the dictionary are not required.

Also, the speech recognition module 106 can complete speech recognition merely with the neural network and does not require complex speech recognition decoders. However, in other embodiment, a language model can be further applied to the result of the word unit end-to-end model in order to improve accuracy of the speech recognition. Also, in the described embodiment, the speech recognition module 106 receives the input sequence of the acoustic features. However, in another embodiment, a raw waveform of the audio signal data 102 can also be received by the speech recognition module 106. Thus, the raw audio signal data 102 can be treated as a kind of acoustic feature.

The speech recognition module 106 finds a word sequence with maximum likelihood based on the input sequence of the acoustic features, and outputs the word sequence as the result 108.

The forward-shifted CTC training system 110 shown in FIG. 1 is configured to perform the novel CTC training to obtain the CTC model 170 that constitutes the speech recognition module 106 at least in part.

In the described embodiment, the training data store 120 stores the collection of training data, each of which includes speech data and a corresponding transcription.

Note that the speech data stored in the training data store 120 can be given in the form of a sequence of acoustic features after feature extraction that can be the same as that performed by the feature extraction module 104 in a front-tend process for inference. If the speech data is given in a form of audio signal data that is the same as the audio signal data 102 for the inference, the speech data can be subjected to the feature extraction before the training to obtain a sequence of acoustic features. Also, the transcription can be given in a form of a sequence of phones, context dependent phones, characters, word-pieces or words in a manner depending on the unit that the CTC model 170 is targeting.

In the described embodiment, each training sample is given as a pair of an input sequence of observations and a target sequence of symbols where the observations are the acoustic features and the symbols are the sub-words (e.g. phones) or words. The training data can be stored in an internal or external storage device operatively coupled to processing circuitry.

The forward-shifted CTC training system 110 performs the novel CTC training process to obtain the CTC model 170. During the novel CTC training process, the forward-shifted CTC training system 110 performs predetermined processing on a sequence of predictions obtained from the CTC model being trained before a CTC computation and parameter update of the CTC model.

Before describing the novel CTC training, first, an exemplary architecture of the CTC model is described.

Figure 2:
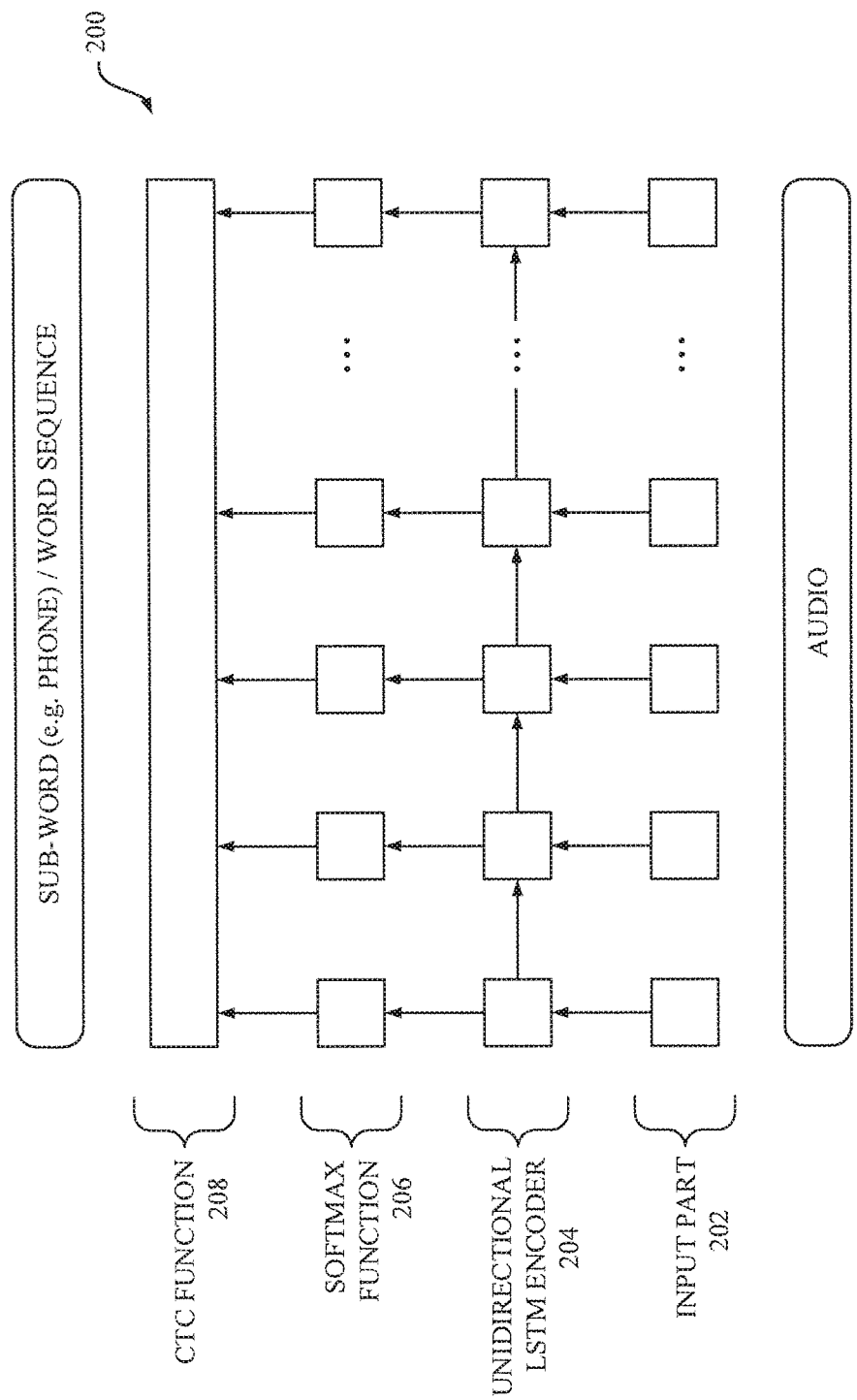
FIG. 2 shows a schematic of a unidirectional LSTM CTC model as an example of a CTC model to be trained according to the embodiment of the present invention.

With reference to FIG. 2, a schematic of a LSTM CTC model is shown as an example of the CTC model. To train the CTC model, pairs of sub-word (e.g. phone)/word sequence and audio signal data without alignment are fed. The LSTM CTC model 200 can include an input part 202 for receiving an input sequence of acoustic features that are obtained from the given audio signal data via the feature extraction; a LSTM encoder 204; a softmax function 206; and a CTC loss function 208. As an input for the CTC model, frame stacking, in which successive frames are stacked together as a super frame, is also contemplated.

The LSTM encoder 204 transforms the input sequence of the acoustic features into high level features. The LSTM encoder 204 shown in FIG. 2 is unidirectional. Note that term "unidirectional" means, in contrast to a bidirectional model where the network gets information from past and future states simultaneously, that the network merely gets information from a past state and does not get a future state. Using the unidirectional model is preferable for streaming (and possibly real-time) ASR since the unidirectional model does not require a whole frame sequence before decoding. The unidirectional model can output a prediction in sequence as an acoustic feature arrives.

The softmax function 206 computes a probability distribution by normalization based on the output high level features that are obtained from the LSTM encoder 204. The CTC loss function 208 is a specific type of a loss function designed for the sequence labeling tasks.

Note that related NN/HMM hybrid system training requires a frame-level alignment and requires the length of the target sequence of phones to be equal to the length of the input sequence of acoustic features. This frame-level alignment can be achieved generally by a forced alignment technique. However, this frame-level alignment makes the training process complex and time-consuming.

In contrast to the related NN/HMM system, the target sequence of sub-words or words required for training the CTC model can have a different length from the input sequence of acoustic features. Generally, the length of the input sequence of acoustic features is much longer than the target sequence of sub-words or words. That is, no frame-level alignment is required and there is no time alignment supervision for training the CTC model.

Due to the aforementioned nature, the CTC model with the unidirectional LSTM encoder trained without the frame level alignment yields output symbols after the CTC model consumes sufficient information for the output symbols, which results in time delay between the acoustic features and the output symbols (sub-words or words). This time delay is not of the type that can be reduced by investing large amounts of resources.

Figure 3:
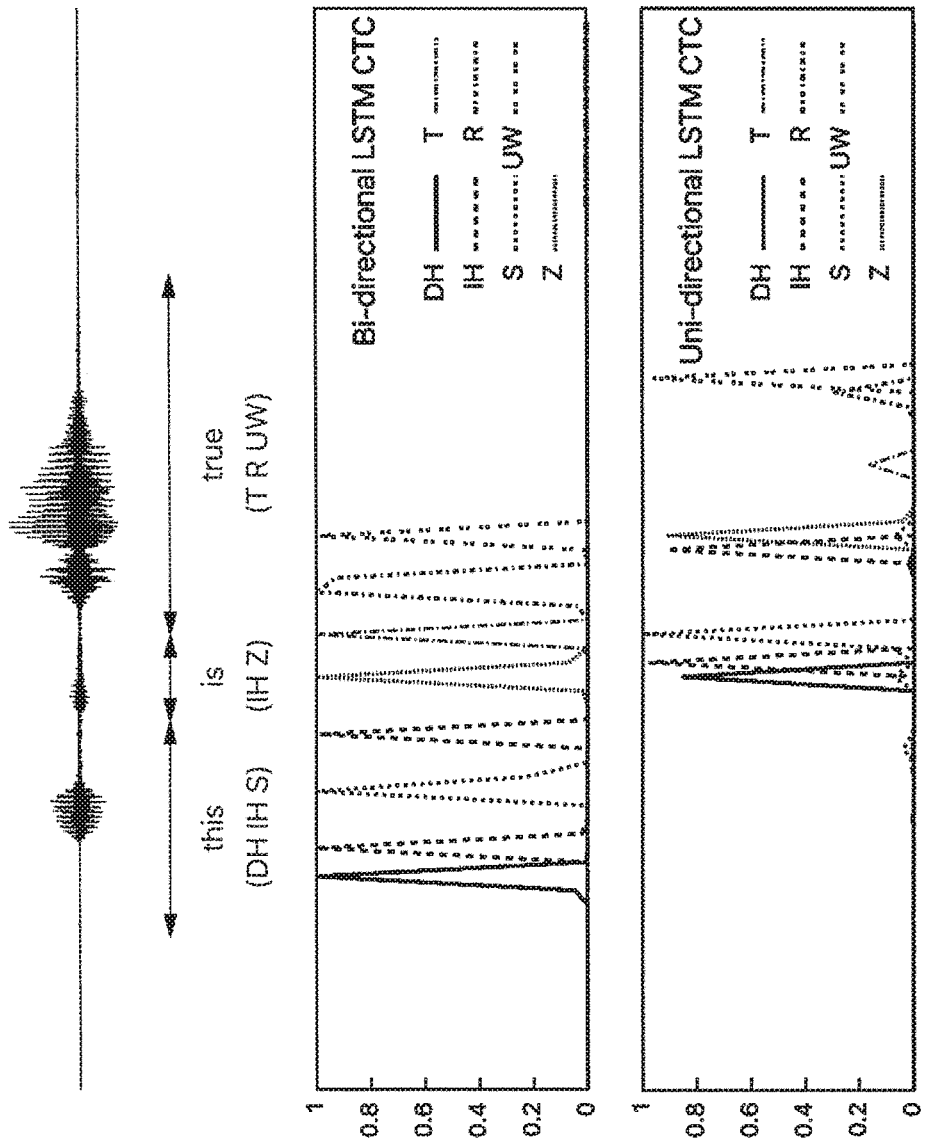
FIG. 3 shows a speech signal for an example sentence "this is true" and resultant phone probabilities computed for the example speech signal from bidirectional and unidirectional LSTM phone CTC models trained by standard training process.

FIG. 3 shows a waveform of a speech signal of an example sentence "this is true" at the top. FIG. 3 also shows resultant phone probabilities computed for the example speech signal from bidirectional and unidirectional LSTM phone CTC models that were trained by standard CTC training process, at the middle and the bottom.

The CTC model emits spiky and sparse posterior distributions over target output symbols (sub-words or words) where most frames emit blank symbols with high probabilities and a few frames emit target output symbols of interest. Note that the symbol having the highest posterior probability except for at least a blank at each time index is called as a 'spike' herein. In FIG. 3, probabilities of blank symbols are omitted for the purpose of convenience. Spike timing that the trained CTC model emits is generally not controlled.

As shown in the bottom of FIG. 3, the spike timings from the unidirectional LSTM model are delayed from actual acoustic features and the speech signal that is shown in the top of FIG. 3. The spikes corresponding to detected phones 'DH', 'IH', 'S', 'IH', 'Z', 'T', 'R' and 'UW' are output with a time delay relative to the input acoustic features.

Note that the bidirectional LSTM model outputs posterior probabilities that are aligned to the acoustic features as shown in the middle of FIG. 3. It means that the bidirectional LSTM model gives spikes in a more timely manner than the unidirectional model. That is because the bidirectional LSTM model digests a whole input sequence of acoustic features before decoding and leverages information from both past and future states. Thus, using of the unidirectional model is preferable for streaming ASR.

In order to reduce the time delay between spike timings and acoustic features, the forward-shifted CTC training system 110, according to the exemplary embodiment of the present invention, performs a forward shifting on a sequence of predictions (posterior probability distributions) obtained from the CTC model being trained before the CTC computation and the parameter update through back-propagation.

Figure 4:
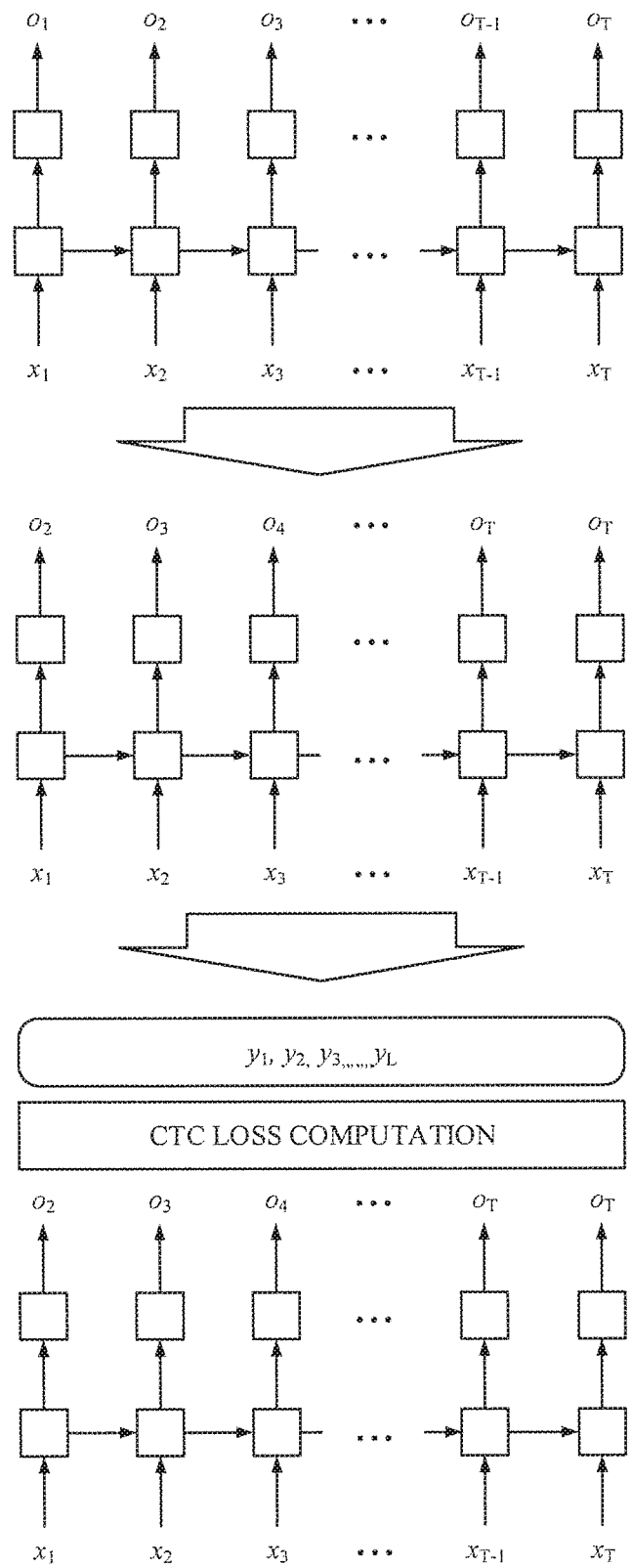
FIG. 4 depicts a way of a forward-shifted CTC training with one frame shift according to the exemplary embodiment of the present invention.

Referring back to FIG. 1 together with FIG. 4, a detailed block diagram of the forward-shifted CTC training system 110 is further described. FIG. 4 describes a way of a forward-shifted CTC training with one frame shift according to the exemplary embodiment of the present invention.

As shown in FIG. 1, the forward-shifted CTC training system 110 can include an input feed module 112 for feeding an input sequence of acoustic features into a CTC model being trained to obtain a sequence of predictions with a forward shift module 114 for forwardly shifting the obtained sequence of predictions and an update module 116 for updating parameters of the CTC model being trained in a manner based on the shifted sequence of predictions.

The input feed module 112 is configured to first obtain a training sample including an input sequence of acoustic feature and a target sequence of sub-words or words as correct labels. The input feed module 112 is also configured to feed the input sequence of acoustic features included in each training sample into the CTC model being trained to obtain a sequence of predictions.

Let X denotes a sequence of acoustic feature vectors over T time steps and $x_t$ be an acoustic feature vector at a time index t (t=1, . . . , T) in the sequence X. By conducting a normal forward propagation from the sequence of acoustic feature vectors $X=\{x_1, \ldots, x_T\}$ through the CTC model, a sequence of predictions $O=\{o_1, \ldots, o_T\}$ is obtained, as shown in the top of FIG. 4, where $o_t$ (t=1, . . . , T) denotes a prediction for each time index t and each prediction $o_t$ is a posterior probability distribution over the target output symbols (sub-words or words).

The forward shift module 114 is configured to shift the obtained sequence of predictions O by a predetermined amount with respect to the input sequence of acoustic feature vectors X to obtain a shifted sequence of predictions O'. In a preferable embodiment, the obtained sequence of predictions O is shifted forwardly with respect to the input sequence of acoustic features X.

The forward shift module 114 is further configured to adjust so that the lengths of the shifted sequence of predictions O' and the input sequence of acoustic feature vectors X are the same. In a particular embodiment, the adjustment can be conducted by padding the end of the sequence of predictions O' with one or more copies of the last element of the predictions, $o_T$, for example, corresponding to the predetermined amount to shift. So, the length of the sequence of predictions O' is kept to T. The use of the copy of the last element of the predictions or is one example. In the described embodiment, padding can be employed as the way of the adjustment. However, the ways of adjusting are not limited to padding. In another particular embodiment, the adjustment can be conducted by trimming the sequence of the acoustic feature vectors X from the end according to the predetermined amount to shift.

When the predetermined amount to shift (the number of frames to shift) is one frame, the shifted sequence of predictions O' holds remaining predictions except for the beginning and the shifted sequence of predictions O' is a set $\{o_2, \ldots, o_T, o_T\}$, as shown in the middle of FIG. 4. Note that the last element of the predictions or is doubled in the shifted sequence of predictions O'. Also Note that merely predictions (posterior probability distributions) are shifted and others including the input acoustic feature vectors are not shifted.

In a preferable embodiment, shifting of the sequence of predictions O is not performed on every training sample and merely performed for a part of the training samples, which can be determined by a predetermined rate. The predetermined rate of training samples to shift can range from approximately 5% to 40%, more preferably, approximately 8% to 35%. Also, the unit amount of the training samples to shift can be one training sample or a group of training samples (e.g. mini-batch).

Additionally, that the amount to shift (or the number of frames to shift) can be fixed to an appropriate value in a particular embodiment. The fixed value can depend on the target of reducing delay time and the time duration of each frame. A reduction in delay commensurate with the time duration of each frame and the number of frames to shift would be obtained.

In another embodiment, the amount to shift can be determined probabilistically within a predetermined range. The term "probabilistically" means that relying upon a predetermined distribution such as uniform distribution. The predetermined range or an upper bound of the predetermined range can be determined in a manner depending on the target of reducing delay time and the time duration of each frame. A reduction in delay commensurate with the time duration of each frame and the average number of frames to shift would be obtained as will be shown experimentally later.

The update module 116 is configured to update the model based on a loss function using the shifted sequence of predictions O' and the target sequence of the symbols (sub-words or words) included in the training sample. As illustrated in the bottom of FIG. 4, by computing CTC loss based on the shifted sequence of predictions O' and conducting a back-propagation through the CTC model, the parameters of the CTC model are updated. Also, the parameter update can be conducted each time one training sample (online) or a group of training samples (e.g. mini-batch) are processed.

CTC computation includes a process of CTC alignment estimation. Let y denote a sequence of target output symbols having a length of L and $y_i$ (i=1, ..., L) be i-th sub-word or word in the target sequence y. In contrast to the related alignment-based NN/HMM hybrid system training that requires L to be equal to T, the CTC introduces an extra blank symbol φ that expands the length-L sequence y to a set of length-T sequences Φ(y), allowing alignment-free training. Each sequence in the set of length-T sequences, y^ (y^ is an element of Φ(y) and is a set of $\{y_1\hat{}, y_2\hat{}, y_3\hat{}, \ldots, y_{T-1}\hat{}, y_T\hat{}\}$), is one of the CTC alignments between the sequence of the acoustic feature vectors X and the sequence of the target output symbols y.

For example, let us assume that a given output phone sequence is 'ABC' and the length of the input sequence is 4. In this case, possible phone sequences would be {AABC, ABBC, ABCC, ABC_, AB_C, A_BC, _ABC} where '_' denotes the blank symbol (φ).

The CTC loss is defined as the summation of the symbol posterior probabilities over all possible CTC alignments as follows:

$$L_{CTC} = - \sum_{y\hat{}\in\Phi(y)} P(y\hat{}|X) = - \sum_{y\hat{}\in\Phi(y)} \prod_{t=1}^{T} P(y_t\hat{}|x_t). \quad (1)$$

The CTC training maximizes the summation of the possible output sequences or minimizes the negative of the summation while allowing blank output for any frame probabilities. The update module 116 updates parameters of the CTC model so as to minimize the CTC Loss $L_{CTC}$. Note that minimizing a loss (CTC loss) includes maximizing the negative of the loss, which can be called a reward, a utility, or a fitness. The update module 116 can calculate the CTC loss $L_{CTC}$ based on the shifted sequence of predictions O' and conduct back-propagation through the whole network based on the CTC loss $L_{CTC}$ to update the parameters of the CTC model each time the training sample (online) or a group of training samples (e.g. mini-batch) are processed.

The background idea for the forward-shifted CTC training is as follows: If a CTC alignment $(y_1\hat{}, y_2\hat{}, y_3\hat{}, \ldots, y_{T-1}\hat{}, y_T\hat{})$ has a high probability P(y^|X) in the aforementioned equation (1) before the forward-shifting, the forward-shifting of the sequence of predictions translates into a high probability for the forward-shifted CTC alignment $(y_2\hat{}, y_3\hat{}, \ldots, y_{T-1}\hat{}, y_T\hat{}, y_T\hat{})$. Due to the high probability of the forward-shifted CTC alignment, the whole network of the CTC model is trained to promote the forward-shifted CTC alignment through the back-propagation, which results in reduced time delay after the entire training.

In the described embodiment, the CTC model is described to be unidirectional LSTM models. However, the architectures of the CTC that is a target of the novel forward-shifted CTC training is not limited and can be any RNN type models, which includes a basic RNN, LSTM (Long Short-Term Memory), GRU (Gated Recurrent Unit), Elman network, Jordan network, Hopfield network, etc. Also, the RNN type models can include more complex architectures such as any one of the aforementioned RNN type models used in combination with other architecture such as CNN (Convolutional Neural Network), VGG, ResNet, and Transformer.

Note that the novel forward-shifted CTC training is only used in training. The trained CTC model can be used the same as a model trained by the normal CTC training. The topology (e.g. the way the neurons are connected) and the configuration (e.g., the numbers of hidden layers and units) of the CTC model and a way of decoding with the CTC model are unchanged.

In particular embodiments, each of the modules 104, 106 and the forward-shifted CTC training system 110 and each of the modules 112, 114 and 116 of the forward-shifted CTC training system 110 described in FIG. 1 can be, but not limited to, implemented as a software module including program instructions and/or data structures in conjunction with hardware components such as a processor, a memory, etc.; as a hardware module including electronic circuitry; or as a combination thereof.

They can be implemented on a single computer device such as a personal computer and a server machine or over a plurality of devices in a distributed manner such as a computer cluster of computer devices, client-server system, cloud computing system, edge computing system, etc.

The training data store 120 and a storage for parameters of the CTC models 170 can be provided by using any internal or external storage device or medium, to which processing circuitry of a computer system implementing the forward-shifted CTC training system 110 is operatively coupled.

Also in a particular embodiment, the feature extraction module 104, the speech recognition module 106 including the CTC model 170 that is trained by the forward-shifted CTC training system 110 are implemented on a computer system of a user side while the forward-shifted CTC training system 110 is implemented on a computer system of a provider side of speech recognition system.

In a further variant embodiment, merely the feature extraction module 104 is implemented on the user side and the speech recognition module 106 is implemented on a provider side. In this embodiment, the computer system of the client side merely transmits the sequence of the acoustic features to the computer system of the provider side and receives the decoded result 108 from the provider side. In another variant embodiment, both of the feature extraction module 104 and the speech recognition module 106 are implemented on the provider side and the computer system of the client side merely transmits the audio signal data 102 to the computer system of the provider side and receives the decoded result 108 from the provider side.

Figure 5:
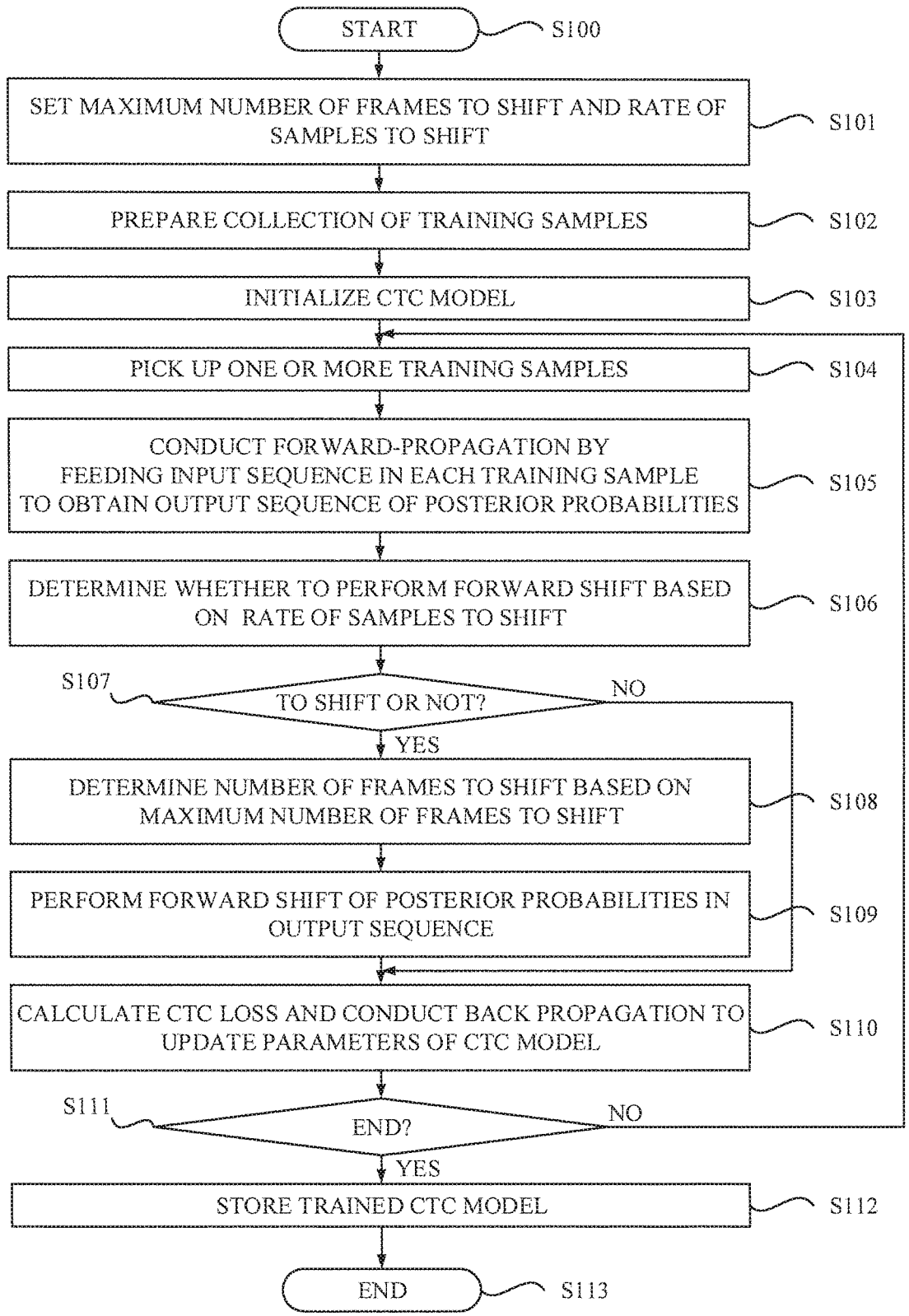
FIG. 5 is a flowchart depicting a novel forward-shifted CTC training process for training a CTC model used for the speech recognition according to an exemplary embodiment of the present invention.

Hereinafter, referring to FIG. 5, a novel forward-shifted CTC training process for training a CTC model used for speech recognition according to an exemplary embodiment of the present invention is described. FIG. 5 is a flowchart depicting the novel forward-shifted CTC training process. Note that the process shown in FIG. 5 can be performed by processing circuitry such as a processing unit of a computer system that implements the forward-shifted CTC training system 110 and its modules 112, 114 and 116 shown in FIG. 1.

The process shown in FIG. 5 can begin at step S100 in response to receiving a request for the novel forward-shifted CTC training from an operator, for example.

At step S101, the processing unit can set training parameters that includes the maximum number of frames to shift (the amount to shift) and a rate of samples to shift in the novel forward-shifted CTC training.

At step S102, the processing unit can prepare a collection of training samples from the training data store 120. Each training sample can include an input sequence of acoustic feature vectors X having the length T and a target sequence of symbols (sub-words (e.g. phone) or words) y having the length L.

At step S103, the processing unit can initialize a CTC model. Initial values of the parameters of the CTC model are set appropriately.

At step S104, the processing unit can pick up one or more training samples in the prepared collection. A mini batch of training samples can be picked up.

At step S105, the processing unit can conduct, for each picked-up training sample, a forward-propagation through the CTC model by feeding the input sequence of acoustic feature vectors X to obtain a sequence of predictions O having the length T.

At step S106, the processing unit can determine whether to perform forward-shifting based on the rate of samples to shift given at step S101. The mini-batch can be selected randomly with the predetermined rate as the target of the forward-shifting.

At step S107, the processing unit can branch the process in a manner depending on the determination conducted at step S106. In step S107, when the processing unit determines that the picked-up training samples are the target of the forward-shifting (YES), the process can proceed to S108.

At step S108, the processing unit can determine the number of frames to shift based on the maximum number of frames to shift given at step S101. The number of frames to shift can be determined probabilistically based on a particular distribution. In a particular embodiment, the number of frames to shift can be determined, for the selected mini-batch, from an integer uniform distribution to an upper bound (the maximum number of frames to shift).

At step S109, the processing unit can perform forward shifting on the sequence of predictions O obtained at step S105 to generate a shifted sequence of predictions O'.

On the other hand, in response to determining in step S107 that the picked up training samples are not target of the forward-shifting (NO), the process can proceed to S110 directly.

At step S110, the processing unit can calculate CTC loss using the shifted sequence of predictions O' or the original sequence of predictions O and conduct a back-propagation through the CTC model to update the parameters of the CTC model. The forward-shift can be performed for the selected mini-batches. For the remaining mini-batches, the CTC training can be performed as normal.

At step S111, the processing unit can determine whether the process ends or not. When a predetermined convergence condition or termination condition is met, the processing unit can determine that the process is to be terminated.

In response to determining in step S111 that the process does not end (NO), the process can loop back to S104 for subsequent training samples. On the other hand, in response to determining in step S111 that the process ends (YES), the process can proceed to S112. At step S112, the processing unit can store the currently obtained parameters of the CTC model into an appropriate storage device and process can end at step S113.

According to the aforementioned embodiments, a novel training technique capable of reducing time delay between outputs and inputs of a model that are trained with training samples having different lengths of input observations and output symbols in an efficient manner is provided.

The novel CTC training enables the trained model to output predictions at an appropriate timing to reduce latency of a prediction process with respect to an input. Preferably, the trained model outputs predictions earlier and it is possible to reduce latency of the prediction process with respect to the input. The trained model is suitable for a streaming ASR application. As demonstrated in the experimental results described later, the latency and speech recognition accuracy can be balanced by tuning the training parameters of the novel CTC training.

While the actual overall latency of streaming end-to-end ASR is affected by other factors, reducing the time delay between the acoustic features and the symbols would either result in lower latency of streaming ASR or allow more time for subsequent (post) processes to improve accuracy. Compared with the normal CTC training, the novel forward-shifted CTC training does not require any additional information such as frame-level forced alignments. In addition, in decoding, the CTC model trained with this forward-shifted training can be used the same as the model trained with the normal CTC training.

Furthermore, as demonstrated in the experimental results described later, there is almost no adverse effect on the accuracy of the CTC model for the speech recognition.

In the aforementioned embodiment, the CTC model trained by the forward-shifted CTC training system 110 is described to be used directly as the CTC model 170 that constitutes the speech recognition module 106. However, in other embodiments, the CTC model trained by the forward-shifted CTC training system 110 may be not used directly as the CTC model 170. In a particular embodiment, the CTC model trained by the forward-shifted CTC training system 110 can be used in a knowledge distillation framework. For example, a unidirectional LSTM trained by the forward-shifted CTC training system 110 can be used as a guiding CTC model and a bidirectional LSTM model trained under guidance of the guiding CTC model can be used as a teacher model for knowledge distillation to a student unidirectional LSTM model, which is used as the CTC model 170. For example, a bidirectional LSTM model trained under guidance of a guiding CTC model can be used as a teacher model for knowledge distillation to a student unidirectional LSTM model, in which the student unidirectional LSTM model is trained based on the forward shifting.

Also note that, in further other embodiment, the CTC model trained by the forward-shifted CTC training system 110 may be not used solely as the CTC model 170. In other particular embodiment, a posterior fusion involving the CTC model trained by the forward-shifted CTC training system 110 is also contemplated.

Note that the languages to which the novel training for speech recognition according to the exemplary embodiments of the invention may be applicable is not limited and such languages can include, but by no means be limited to, Arabic, Chinese, English, French, German, Japanese, Korean, Portuguese, Russian, Swedish, Spanish, for instance. Since the novel training has alignment-free nature, the GMM/HMM system for the forced alignment can be omitted. Also, when a word unit end-to-end model is employed, any dictionary and any language model are not required. Hence, the novel training is suitable for certain languages where the GMM/HMM system and/or dictionary are difficult to prepare.

Furthermore, in the aforementioned embodiments, the novel forward-shifted CTC training has been described to be applied to the speech recognition. However, applications to which the CTC model is applicable are not limited to the speech recognition. The CTC model can be used in various sequence recognition tasks other than the speech recognition. Also, the issue of delay time would arise not only in the speech recognition but also in other sequence recognition tasks. Such sequence recognition tasks can include handwritten text recognition from images or sequences of pen strokes, optical character recognition, gesture recognition, machine translation, etc. Thus, the novel forward-shifted CTC training is expected to be applied to such other sequence recognition tasks.

Although the advantages obtained with respect to the one or more specific embodiments according to the present invention have been described and will be described below, it should be understood that some embodiments could not have these potential advantages, and these potential advantages are not necessarily required of all embodiments.

Experimental Studies

A program implementing the forward-shifted CTC training system 110 shown in FIG. 1 and the forward-shifted CTC training process described in FIG. 5 according to the exemplary embodiment was coded and executed for a given set of speech data. ASR experiments were conducted with a standard English conversational telephone speech data set to verify working of the novel forward-shifted CTC training. The novel forward-shifted CTC training was applied to train unidirectional LSTM phone CTC models and unidirectional LSTM word CTC models. The time delay was measured from a sufficiently strong offline hybrid model trained from frame-level forced alignments.

Experimental Setup 262 hours of segmented speech from the standard 300-hour Switchboard-1 audio with transcripts were used. For acoustic features, 40-dimensional logMel filterbank energies over 25 msec frames every 10 msec were extracted. This static feature and its delta and double-delta coefficients were used with frame stacking having a decimation rate of 2. For evaluation, the Switchboard (SWB) and CallHome (CH) subsets of the NIST Hub5 2000 evaluation data set were used. Considering that the training data consists of SWB-like data, testing on the CH test set is a mismatched scenario for the models.

For unidirectional LSTM phone CTC models, 44 phones from the Switchboard pronunciation lexicon and the blank symbol were used. For decoding, a 4-gram language model with 24M words was trained from the Switchboard and Fisher transcripts with a vocabulary size of 30K. A CTC decoding graph was constructed. For neural network architecture, 6 unidirectional LSTM layers (unidirectional LSTM encoder) with 640 units and a fully-connected linear layer of 640×45 was stacked, followed by a softmax activation function. All neural network parameters were initialized to samples of a uniform distribution over $(-\epsilon, \epsilon)$, where $\epsilon$ is the inverse square root of the input vector size.

For word CTC models, words with at least five occurrences in the training data were selected. This resulted in an output layer with 10,175 words and the blank symbol. The same 6 unidirectional LSTM layers were selected and 1 fully-connected linear layer with 256 units was added to reduce computation. A fully-connected linear layer of 256× 10,176 was put, followed by a softmax activation function. For better convergence, the unidirectional LSTM encoder part was initialized with the trained phone CTC model. Other parameters were initialized in similar fashion as the phone CTC models. For decoding, a simple peak-picking was carried out over the output word posterior distribution and repetitions and blank symbols were removed.

All models were trained for 20 epochs and Nesterov-accelerated stochastic gradient descent was used with a learning rate starting from 0.01 and annealing at $(0.5)^{1/2}$ per epoch after epoch 10. The batch size was 128.

For the novel forward-shifted CTC training, two parameters, including "shift max" indicating the maximum number of frames to shift and "shift rate" that is the rate of the mini-batch whose output posterior probabilities are shifted. The training mini-batches were selected randomly with the "shift rate" and the forward-shift was performed on the selected mini-batches. For the shift size, the shift size was selected for each selected mini-batch from an integer uniform distribution over 0 to an upper bound, which is provided by the training parameter "Shift max".

Posterior Spikes

As noted above, the CTC models emit very spiky posterior distributions. Posterior probabilities for an utterance "this(DH IH S) is(IH Z) true(T R UW)" from the SWB test set was investigated.

Figure 6:
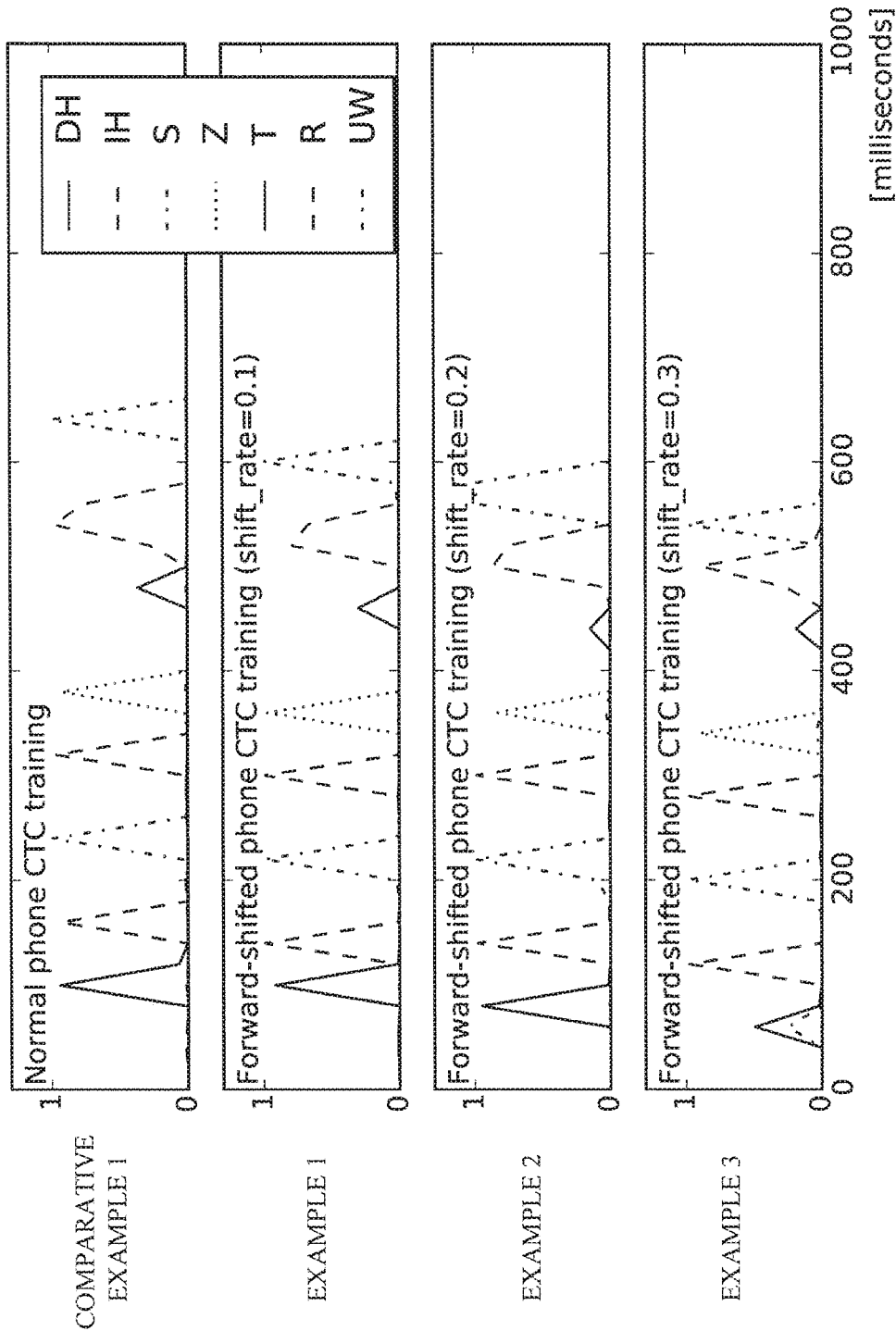
FIG. 6 shows posterior probabilities of phone CTC models trained by the forward-shifted CTC training where the maximum number of frames to shift was set to 1 and the rate of samples to shift varied from 0.1 to 0.3.

FIG. 6 shows posterior probabilities of phone CTC models trained by the novel forward-shifted CTC training where the maximum number of frames to shift (shift max) was set to 1 and a rate of samples to shift (shift rate) varied from 0.1 to 0.3 (Examples 1-3). Compared with posterior spikes from the normal CTC training (Comparative Example 1) at the top, posterior spikes from the forward-shifted CTC training (Examples 1-3) appeared earlier, which is the expected behavior of the novel forward-shifted CTC training.

Figure 7:
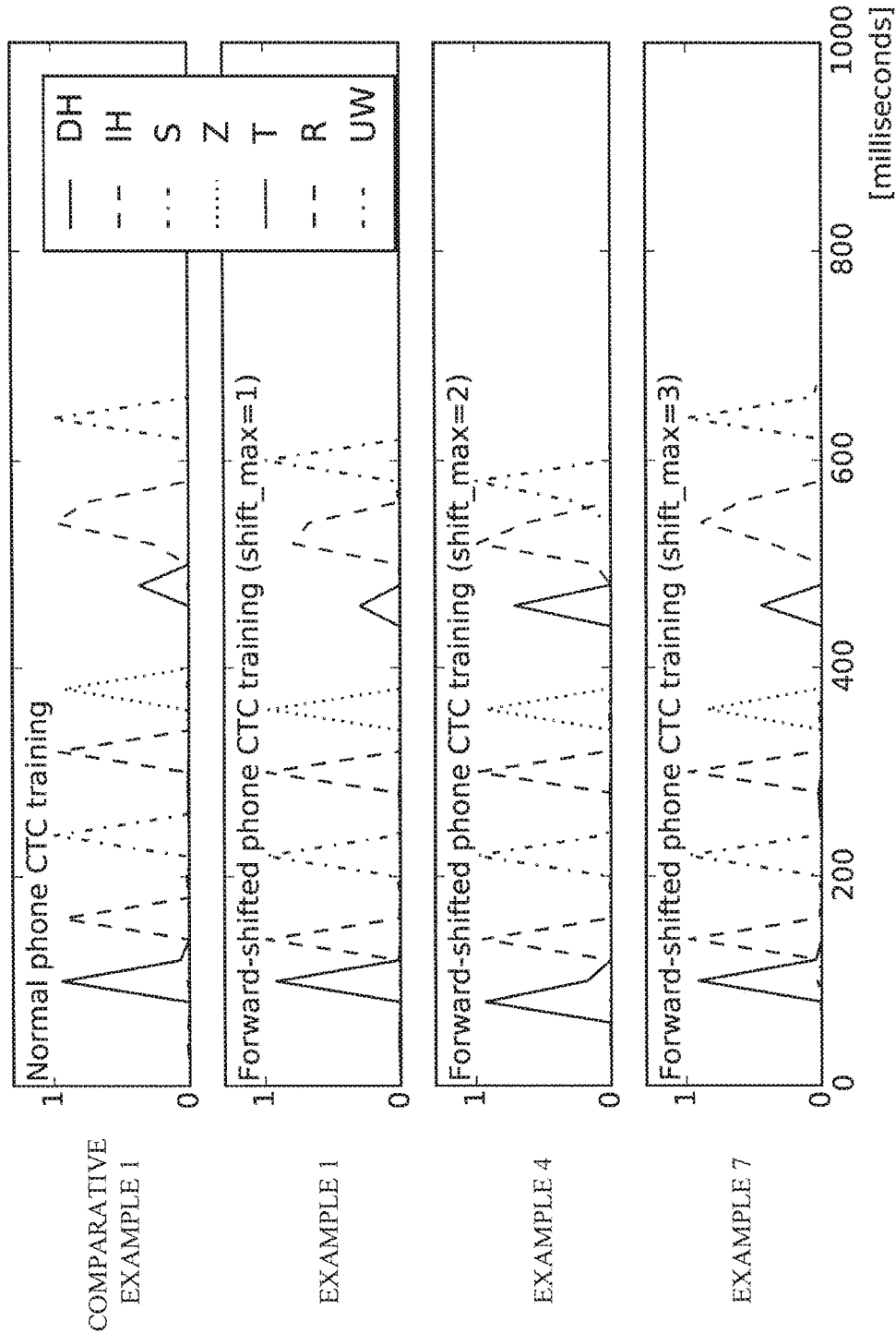
FIG. 7 shows posterior probabilities of phone CTC models trained by the forward-shifted CTC training where the rate of samples to shift was set to 0.1 and the maximum number of frames to shift varied from 1 to 3.

FIG. 7 shows posterior probabilities of phone CTC models with forward-shifted CTC training where the rate of samples to shift (shift rate) was set to 0.1 and the maximum number of frames to shift (shift max) varied from 1 to 3 (Examples 1, 4 and 7). While some earlier spikes appeared here as well, some spikes were not forward-shifted, especially with cases of the larger maximum number of frames to shift (shift max).

Figure 8:
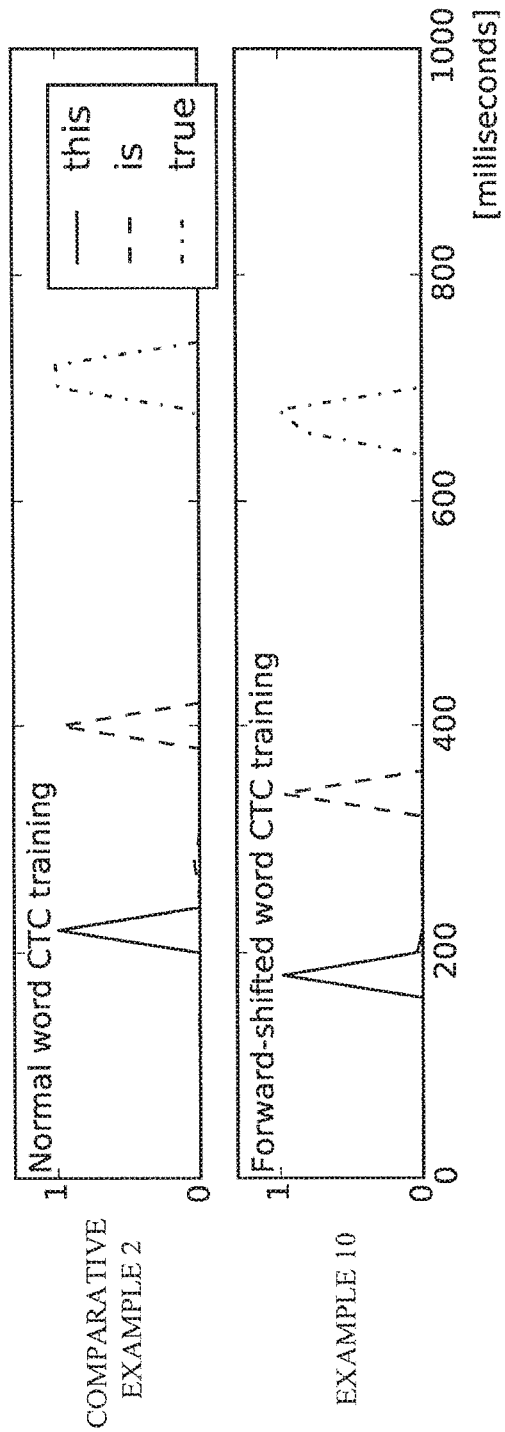
FIG. 8 shows posterior probabilities of word CTC models trained by the forward-shifted CTC training where the maximum number of frames to shift was set to 1 and the rate of samples to shift was set to 0.1.

Finally, the posterior probabilities of word CTC models with the forward-shifted CTC training was investigated. FIG. 8 shows posterior probabilities of word CTC models with forward-shifted CTC training where the maximum number of frames to shift (shift max) was set to 1 and the rate of samples to shift (shift rate) was set to 0.1 (Example 10). As shown in FIG. 8, it was confirmed that earlier spike timings was obtained from the CTC models trained with the forward-shifted training. Note that for all word CTC models with the normal and the forward-shifted CTC training, the unidirectional LSTM phone CTC model trained with the normal CTC training was used for initialization.

Time Delay from Hybrid Model

Figure 9:
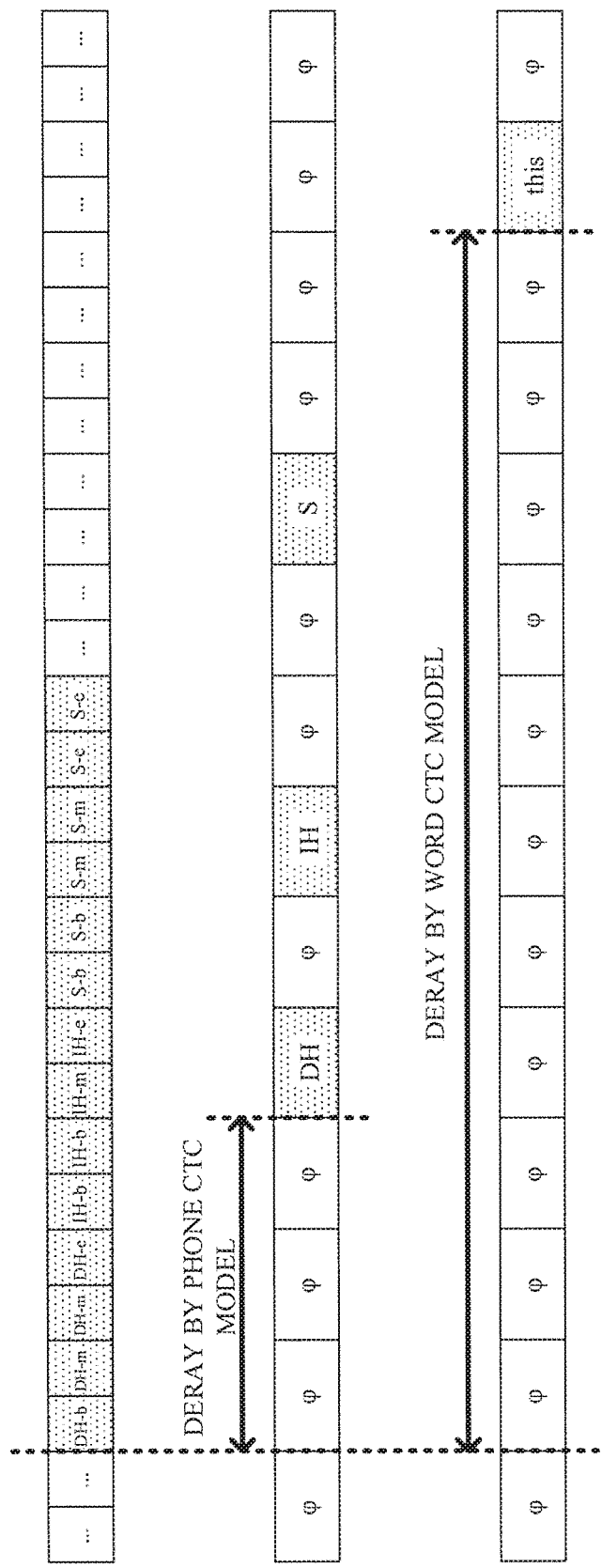
FIG. 9 shows a time delay by phone and word CTC models with respect to a hybrid model.

Next, the time delay of each word after decoding for the SWB and CH test sets was investigated. FIG. 9 shows a definition of time delay by phone and word CTC models with respect to a hybrid model. In FIG. 9, each box represents unit of output symbol prediction for each model. Note that due to lower frame rate realized by input frame stacking and decimation in CTC models, unit sizes are different between hybrid model and CTC models. For hybrid model, "-b", "-m", and "-e" represent three states of HMM and identifier of context-dependent variants for each state is omitted from this figure for simplicity.

To set the ground truth of the timing of words, a sufficiently strong offline hybrid model trained on the 2000-hour Switchboard+Fisher dataset through iterative and careful forced alignment steps was used. More specifically, a combination of two bidirectional LSTM and one Residual Network (ResNet) acoustic models and the n-gram language model was used for decoding and time stamps were obtained for each word. WERs for the SWB and CH test sets with this hybrid model were 6.7% and 12.1%, respectively, which were much better than those with the following CTC models. This hybrid model is not for streaming ASR and was used to obtain appropriate alignments for reference. In addition, also note that this hybrid model was trained with much more training data.

For the output from phone CTC models, the time stamps after decoding were also obtained. For both the hybrid and phone CTC decoding, the same graph-based static decoder was used, while the blank symbols were appropriately handled. For word CTC models, the first spike of each word occurrence was assumed as its beginning time. To measure the delay, the recognition results from the hybrid and CTC models were first aligned with dynamic programming-based string matching and the average delay at the beginning of the aligned words was calculated, as shown in FIG. 9. For unidirectional LSTM phone CTC models, the shift max was changed from 1 to 3 and the shift rate from 0.1 to 0.3 was investigated (Examples 1-9). The conditions and evaluated results of Examples and Comparative Example for unidirectional LSTM phone CTC models are summarized in Table 1.

TABLE 1

|  | shift max | shift rate | SWB | | CH | |
| --- | --- | --- | --- | --- | --- | --- |
|  |  |  | WER[%] | DERAY | WER[%] | DERAY |
| Comparative Example 1 | — | — | 16.2 | 178.0 | 29.5 | 173.7 |
| Example 1 | 1 | 0.1 | 15.8 | 168.5 | 29.5 | 165.1 |
| Example 2 | 1 | 0.2 | 16.2 | 151.7 | 29.4 | 148.5 |
| Example 3 | 1 | 0.3 | 16.7 | 139.2 | 29.6 | 135.7 |
| Example 4 | 2 | 0.1 | 16.5 | 162.8 | 29.4 | 158.6 |
| Example 5 | 2 | 0.2 | 16.3 | 155.6 | 29.3 | 151.1 |
| Example 6 | 2 | 0.3 | 16.6 | 138.5 | 29.8 | 135.5 |
| Example 7 | 3 | 0.1 | 16.3 | 170.4 | 29.5 | 166.5 |
| Example 8 | 3 | 0.2 | 16.3 | 155.7 | 29.8 | 151.3 |
| Example 9 | 3 | 0.3 | 16.8 | 149.4 | 30.0 | 145.9 |

While there were some fluctuations in WERs and time delay, it was demonstrated that constant reduction in the delay was obtained by using the novel forward-shifted CTC training. This trend was common both in the matched SWB and the unmatched CH test sets. For example, as written in bold in Table 1, the time delay was decreased by 25 msec without observing a negative impact on WERs. By setting the shift rate larger, further reduction in the time delay was obtained while sacrificing WERs, which can provide developers of the streaming applications with options to tune time delay. The same as with the previous investigation of the spike timing, additional time delay reduction was not observed by setting the shift max larger.

For the unidirectional LSTM word CTC model, the same setting as in the previous investigation of spike timings was used (Examples 10). The conditions and evaluated results of Example 10 and Comparative Example 2 for unidirectional LSTM word CTC models are summarized in Table 2.

TABLE 2

|  | SWB | | CH | |
| --- | --- | --- | --- | --- |
|  | WER[%] | DERAY | WER[%] | DERAY |
| Comparative Example 2 | 24.1 | 314.5 | 36.4 | 304.4 |
| Example 10 | 24.7 | 288.2 | 36.4 | 280.1 |

It was confirmed that the time delay was reduced by approximately 25 msec with the novel forward-shifted training, while a marginal WER degradation for the SWB test set was observed.

It was demonstrated that the novel forward-shifted CTC training can reduce the time delay between acoustic features and output symbols in unidirectional LSTM phone and word CTC models. It was also investigated that the novel forward-shifted CTC training enables the trained model to generate spikes earlier. It was also confirmed that in most cases the time delay could be reduced by about 25 msec without a negative impact on the WER. It is noteworthy that the CTC models trained with the novel forward-shifted training simply generate output symbols earlier and can be used without any change to the existing decoders for the models trained with the normal CTC training. Note that reducing latency to less than 200 milliseconds, which is known as the acceptable limit in human-machine interaction, is desired and various efforts have been conducted and combined to achieve this. The 25 milliseconds obtained by just a simple modification of the CTC training pipeline is preferable and can be combined with other efforts.

Computer Hardware Component

Figure 10:
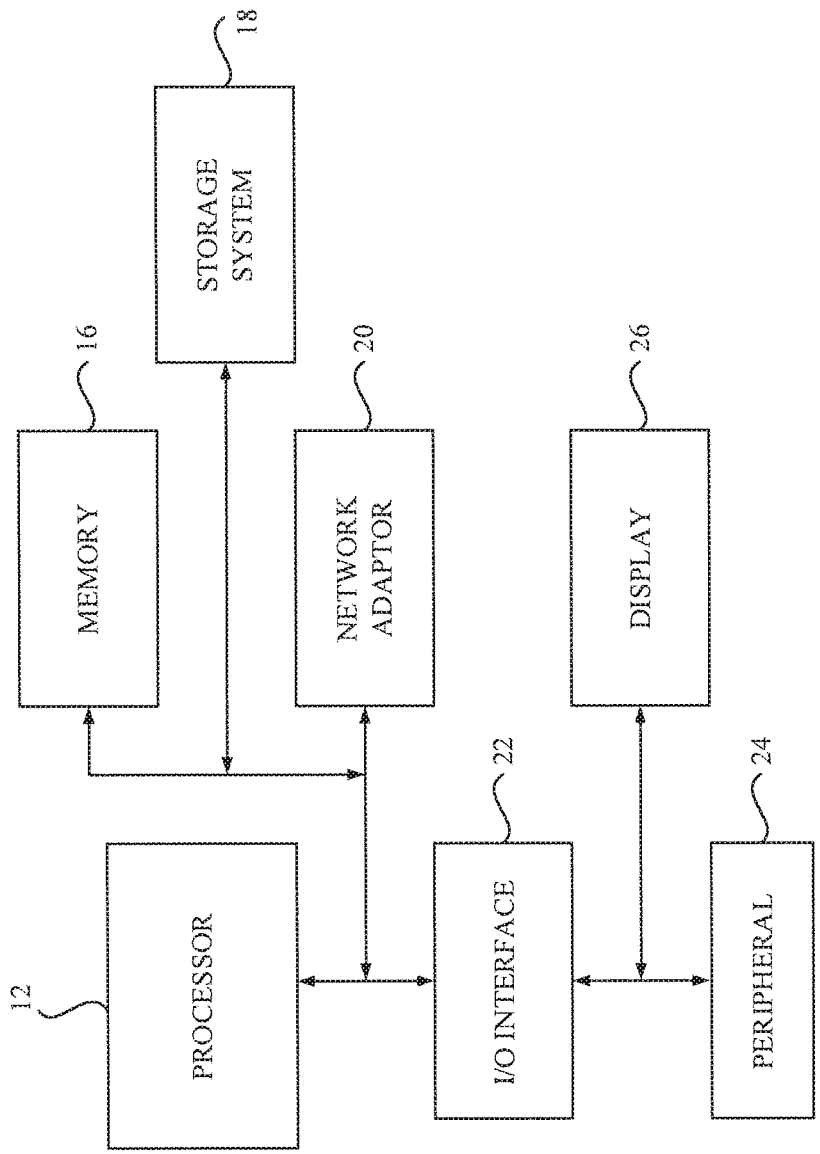
FIG. 10 depicts a schematic of a computer system according to one or more embodiments of the present invention.

Referring now to FIG. 10, a schematic of an example of a computer system 10, which can be used for the speech recognition system 100, is shown. The computer system 10 shown in FIG. 10 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that can be suitable for use with the computer system 10 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 can be described in the general context of computer system-executable instructions, such as program modules, being executed by a computer system. Generally, program modules can include routines, programs, objects, components, logic, data structures, and so on that perform particular tasks or implement particular abstract data types.

As shown in FIG. 10, the computer system 10 is shown in the form of a general-purpose computing device. The components of the computer system 10 can include, but are not limited to, a processor (or processing unit) 12 and a memory 16 coupled to the processor 12 by a bus including a memory bus or memory controller, and a processor or local bus using any of a variety of bus architectures.

The computer system 10 typically includes a variety of computer system readable media. Such media can be any available media that is accessible by the computer system 10, and it includes both volatile and non-volatile media, removable and non-removable media.

The memory 16 can include computer system readable media in the form of volatile memory, such as random access memory (RAM). The computer system 10 can further include other removable/non-removable, volatile/non-volatile computer system storage media. By way of example only, the storage system 18 can be provided for reading from and writing to a non-removable, non-volatile magnetic media. As will be further depicted and described below, the storage system 18 can include at least one program product having a set (e.g., at least one) of program modules that are configured to carry out the functions of embodiments of the invention.

Program/utility, having a set (at least one) of program modules, can be stored in the storage system 18 by way of example, and not limitation, as well as an operating system, one or more application programs, other program modules, and program data. Each of the operating system, one or more application programs, other program modules, and program data or some combination thereof, can include an implementation of a networking environment. Program modules generally carry out the functions and/or methodologies of embodiments of the invention as described herein.

The computer system 10 can also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention can be a computer system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, steps, layers, elements, and/or components, but do not preclude the presence or addition of one or more other features, steps, layers, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for training a model, comprising:
    obtaining training samples including an input sequence of observations and a target sequence of symbols;
    feeding the input sequence of observations into the model to obtain a sequence of predictions;
    determining a time delay between spike timings and acoustic features obtained from the model being trained and reducing the time delay between spike timings and acoustic features obtained from the model being trained by forward-shifting the sequence of predictions for a part of the training samples with respect to the input sequence of observations to generate a shifted sequence of predictions;
    enhancing alignment accuracy between spike timings and acoustic features, and maintaining alignment of the timing between the input sequence and the shifted sequence using a compensatory last-element extension technique; and
    updating the model based on a loss determined by a loss function computation using the shifted sequence of predictions and the target sequence of the symbols.

2. The method of claim 1, wherein the sequence of predictions is shifted forward with respect to the input sequence of observations to generate the shifted sequence of predictions and wherein the model is unidirectional.

3. The method of claim 2, wherein the model is a recurrent neural network based model.

4. The method of claim 2, wherein the loss is CTC (Connectionist Temporal Classification) loss.

5. The method of claim 2, wherein shifting the sequence of predictions comprises:
    adjusting so that the lengths of the shifted sequence of predictions and the input sequence of observations are equal lengths.

6. The method of claim 2, wherein shifting the sequence of predictions and updating the model using the shifted sequence of predictions are performed at a predetermined rate.

7. The method of claim 6, wherein the predetermined rate ranges from 5% to 40%.

8. The method of claim 2, wherein an amount to shift is fixed.

9. The method of claim 2, wherein an amount to shift is determined probabilistically within a predetermined range.

10. The method of claim 1, wherein the model is a neural network based model having a plurality of parameters, wherein feeding the input sequence comprises conducting a forward-propagation through the neural network based model, and wherein updating the model comprises performing a back-propagation through the neural network based model to update the plurality of parameters.

11. The method of claim 1, wherein the model comprises an end-to-end speech recognition model, each observation in the input sequence of the training sample represents an acoustic feature and each symbol in the target sequence of the training sample represents a phone, a context dependent phone, a character, a word-piece, or a word.

12. A computer system for training a model, by executing program instructions, the computer system comprising:
a memory storing the program instructions;
processing circuitry in communications with the memory for executing the program instructions, wherein the processing circuitry is configured to:
obtain a training sample including an input sequence of observations and a target sequence of symbols;
feed the input sequence of observations into the model to obtain a sequence of predictions;
determine a time delay between spike timings and acoustic features obtained from the model being trained and reduce the time delay between spike timings and acoustic features obtained from the model being trained by forward-shifting the sequence of predictions for a part of the training samples with respect to the input sequence of observations to generate a shifted sequence of predictions;
enhance alignment accuracy between spike timings and acoustic features, and maintaining alignment of the timing between the input sequence and the shifted sequence using a compensatory last-element extension technique; and
update the model based on a loss determined by a loss function computation using the shifted sequence of predictions and the target sequence of the symbols.

13. The computer system of claim 12, wherein the sequence of predictions is shifted forwardly with respect to the input sequence of observations to generate the shifted sequence of predictions and wherein the model is unidirectional.

14. The computer system of claim 13, wherein the processing circuitry is also configured to:
shift the sequence of predictions so that the lengths of the shifted sequence of predictions and the input sequence of observations are equal lengths.

15. The computer system of claim 13, wherein shifting of the sequence of predictions and updating of the model using the shifted sequence of predictions are performed at a predetermined rate.

16. The computer system of claim 12, wherein the model is a recurrent neural network based model.

17. A computer program product for training a model, the computer program product comprising a non-transitory computer readable storage medium having program instructions embodied therewith, the program instructions executable by a computer to cause the computer to perform a method comprising:
obtaining a training sample including an input sequence of observations and a target sequence of symbols;
feeding the input sequence of observations into the model to obtain a sequence of predictions;
determining a time delay between spike timings and acoustic features obtained from the model being trained and reducing the time delay between spike timings and acoustic features obtained from the model being trained by forward-shifting the sequence of predictions for a part of the training samples with respect to the input sequence of observations to generate a shifted sequence of predictions;
enhancing alignment accuracy between spike timings and acoustic features, and maintaining alignment of the timing between the input sequence and the shifted sequence using a compensatory last-element extension technique; and
updating the model based on a loss determined by a loss function computation using the shifted sequence of predictions and the target sequence of the symbols.

18. The computer program product of claim 17, wherein the sequence of predictions is shifted forwardly with respect to the input sequence of observations to generate the shifted sequence of predictions and wherein the model is unidirectional.

19. The computer program product of claim 18, wherein shifting the sequence of predictions comprises:
adjusting so that the lengths of the shifted sequence of predictions and the input sequence of observations are equal lengths.

20. The computer program product of claim 18, wherein shifting the sequence of predictions and updating the model using the shifted sequence of predictions are performed at a predetermined rate.

21. The computer program product of claim 17, wherein the model is a recurrent neural network based model.

22. A computer program product for decoding using a model, the computer program product comprising a non-transitory computer readable storage medium having program instructions embodied therewith, the program instructions executable by a computer to cause the computer to perform a method comprising:
feeding an input into the model to obtain an output;
wherein the model is trained by:
obtaining a training sample including an input sequence of observations and a target sequence of symbols;
feeding the input sequence of observations into the model to obtain a sequence of predictions;
determining a time delay between spike timings and acoustic features obtained from the model being trained and reducing the time delay between spike timings and acoustic features obtained from the model being trained by forward-shifting the sequence of predictions for a part of the training samples with respect to the input sequence of observations to generate a shifted sequence of predictions;
enhancing alignment accuracy between spike timings and acoustic features, and maintaining alignment of the timing between the input sequence and the shifted sequence using a compensatory last-element extension technique; and
updating the model based on a loss determined by a loss function computation using the shifted sequence of predictions and the target sequence of the symbols.

* * * * *